W. C. D. BODY.

Clack-Valve for Pump.

No. 8,332. Reissued July 16, 1878.

WITNESSES:

Henry N. Miller

C. Sedgwick

INVENTOR:

W. C. D. Body

BY Munn & Co

ATTORNEYS.

N. PETERS, PHOTO-LITHOGRAPHER, WASHINGTON, D. C.

UNITED STATES PATENT OFFICE.

WILLIAM C. D. BODY, OF VIRGINIA CITY, NEVADA.

IMPROVEMENT IN CLACK-VALVES FOR PUMPS.

Specification forming part of Letters Patent No. 193,685, dated July 31, 1877; Reissue No. 8,332, dated July 16, 1878; application filed April 24, 1878.

*To all whom it may concern:*

Be it known that I, WILLIAM CHRISTOPHER DART BODY, of Virginia City, in the county of Storey and State of Nevada, have invented a new and useful Improvement in Clack-Valves for Pumps; and I do hereby declare that the following is a full, clear, and exact description of the same.

My invention relates to certain improvements in the construction of pump-valves or "clacks," as they are commonly known; and it consists in a novel method of forming a face of wood upon a metal valve, so as to make a tight joint of a material which can easily be replaced whenever desired.

Figure 1:
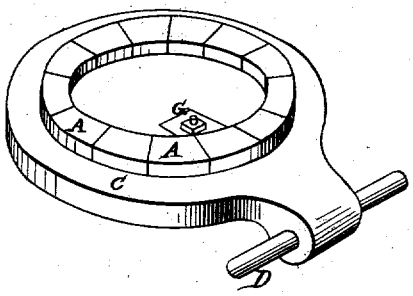
Figure 2:
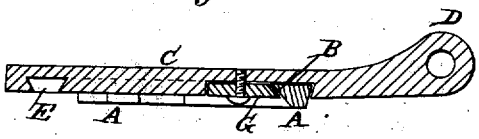

In the accompanying drawings, Figure 1 is a view of my device. Fig. 2 is a section showing the blocks and the method of introducing and holding them.

Similar letters of reference indicate corresponding parts.

The valves of large mining and other pumps are usually made of iron, and have a leather face, properly secured, to form the joint when the valve is closed. This leather face forms a tolerably good joint when used in cold water, and is only open to the objection of rapid wear; but in deep mines hot water is encountered, and the wear of the leather is then so rapid that a set of valves will only last a short time, sometimes only a few hours, causing great delay and expense to replace them.

In my invention I employ a series of rubber, wooden, or other blocks, A, which are sawed of a certain size, and have one end or side cut so as to diverge or form a dovetail, as shown at B. The valve or clack C is made of iron, with a hinge, D, at one side, in the usual manner.

In the face of this valve I turn a groove, E, which is made broader at the bottom than at the top, so as to receive the dovetail-shaped blocks A.

A slot, F, is cut in the face of the valve, connecting with the circular groove at one point, and through this slot I introduce my blocks, moving them around in the groove until the whole space is filled. The last block fills the space opposite the slot, and a block, G, just fits this slot, and is held in place by a screw, H, thus firmly keying all the blocks in place, and preventing them from coming out.

The blocks are preferably made of hard wood, with the end of the grain outward and projecting somewhat—say, three-fourths of an inch—from the surface. This gives me a face which will last for months and make a perfectly tight joint at much less expense than the leather. The wood may be used upon the side as well as the end grain.

Having thus described my invention, I claim as new and desire to secure by Letters Patent—

1. The valve C, having the dovetailed groove E made in its face, and the connecting-slot F, for the introduction of the face-blocks A, substantially as herein described.

2. The groove E, for receiving the face-blocks A, and the connecting-slot F, with its key-block G and screw H, substantially as and for the purpose herein described.

WILLIAM CHRISTOPHER DART BODY.

Witnesses:
GEORGE MARTIN,
DANIEL BOWERS,
S. P. SCANIKER.